US012066172B2

(12) United States Patent
Jiang

(10) Patent No.: US 12,066,172 B2
(45) Date of Patent: Aug. 20, 2024

(54) STAGE LIGHT FIXTURE HAVING LIGHT EFFECT ELEMENTS SERVER

(71) Applicant: Guangzhou Haoyang Electronic Co., Ltd., Guangdong (CN)

(72) Inventor: Weikai Jiang, Guangdong (CN)

(73) Assignee: GUANGZHOU HAOYANG ELECTRONIC CO., LTD., Guangzhou (CN)

( * ) Notice: Subject to any disclaimer, the term of this patent is extended or adjusted under 35 U.S.C. 154(b) by 0 days.

(21) Appl. No.: 18/325,435

(22) Filed: May 30, 2023

(65) Prior Publication Data

US 2024/0219009 A1 Jul. 4, 2024

(30) Foreign Application Priority Data

Dec. 28, 2022 (CN) ......................... 202211693843.5

(51) Int. Cl.

| | |
|---|---|
| ***F21V 21/15*** | (2006.01) |
| ***F21S 10/00*** | (2006.01) |
| ***F21V 5/02*** | (2006.01) |
| ***F21V 21/22*** | (2006.01) |
| ***F21V 21/30*** | (2006.01) |
| ***F21W 131/406*** | (2006.01) |

(52) U.S. Cl.
CPC ............ *F21V 21/15* (2013.01); *F21S 10/007* (2013.01); *F21V 5/02* (2013.01); *F21V 21/22* (2013.01); *F21V 21/30* (2013.01); *F21W 2131/406* (2013.01)

(58) Field of Classification Search
CPC .......... G09F 11/30; G09F 11/34; F21V 11/00; F21V 11/16; F21V 11/18; F21V 11/186; F21V 21/15; F21V 21/22; F21V 21/30; F21V 14/085; F21V 17/002; F21V 17/02; F21V 17/105; F21S 10/007; G03B 21/001; F21W 2131/406
See application file for complete search history.

(56) References Cited

U.S. PATENT DOCUMENTS

2009/0122548 A1* 5/2009 Dalsgaard ............. F21V 17/002 362/282
2009/0323355 A1* 12/2009 Mahaffey .............. F21S 10/007 362/323
2011/0110099 A1* 5/2011 Quadri .................. F21S 10/007 362/418

(Continued)

*Primary Examiner* — Abdulmajeed Aziz
*Assistant Examiner* — Steven Y Horikoshi
(74) *Attorney, Agent, or Firm* — MUNCY, GEISSLER, OLDS & LOWE, PC

(57) ABSTRACT

A stage light fixture having light effect elements server includes a light source arranged in a light head for generating a light beam, effect sheets for generating a light effect, at least one light effect elements server for receiving the effect sheets, and at least one moving mechanism for extracting at least one of the effect sheets from the light effect elements server to move between the light effect elements server and the light beam, and can keep the extracted effect sheet in the light beam. According to the present disclosure, the moving mechanism may not always occupy the space in the direction of the light path of the light beam, but only temporarily occupy the space in the direction of the light path when the effect sheet is moved to the light path, the space thus can be fully utilized.

17 Claims, 5 Drawing Sheets

(56) References Cited

U.S. PATENT DOCUMENTS

| | | | | |
|---|---|---|---|---|
| 2016/0238217 | A1* | 8/2016 | Latteo | F21V 5/048 |
| 2018/0363885 | A1* | 12/2018 | Jurik | G05B 19/23 |
| 2021/0108784 | A1* | 4/2021 | Jiang | F21S 10/007 |

* cited by examiner

STAGE LIGHT FIXTURE HAVING LIGHT EFFECT ELEMENTS SERVER

CROSS REFERENCE TO RELATED APPLICATIONS

The present application claims priority from Chinese Application No. CN 202211693843.5 filed on Dec. 28, 2022, all of which are hereby incorporated herein by reference.

TECHNICAL FIELD

The present disclosure relates to the technical field of stage light fixtures, and more particularly, relates to an improved stage light fixture having a light effect elements server.

BACKGROUND

As a kind of stage illuminating equipment, the stage light fixture is required to simultaneous possess illuminating and lighting atmosphere creation functions. Consequently, various types and numbers of effect sheets for generating rich and colorful light effects are required for the stage light fixture to meet users' demands.

However, different kinds of effect sheets of the stage light fixture are commonly carried by different driving mechanisms respectively, the driving mechanisms each carried the same kind effect sheets are usually arranged in sequence in the light head along the light path, and the effect sheets are switched in or out at the direction perpendicular to the light path by the driving mechanisms. In such configuration, although the effect sheets are modularized according to different types, the respective driving mechanisms will still occupy space at the direction of the light path when effect sheets thereon are not used, causing extraordinarily compact structures inside the light head, which is thus not facilitate miniaturization design of the stage light fixture.

SUMMARY

The present disclosure provides an improved stage light fixture having a light effect elements server, which can achieve that the driving mechanisms for driving the effect sheets to move may merely occupy space in the direction of the light path when in use, and may be withdrawn from the light path when out of use, thereby saving space in the direction of the light path.

According to the present disclosure, the stage light fixture includes a light source arranged in a light head for generating a light beam, a plurality of effect sheets allowing the light beam to generate light effects, at least one light effect elements server for accommodating the effect sheets, and at least one driving mechanism, which is configured to extract at least one of the effect sheets to move between the respective light effect elements server and the light beam, and is able to keep the same effect sheet in the light beam.

According to the stage light fixture in the present disclosure, the plurality of effect sheets are accommodated or received in the light effect elements server, when certain effect sheet needs to be used, such effect sheet can be extracted from the light effect elements server by the driving mechanism, and be moved to the light path to let the light beam generate light effects. While the effect sheet is out of need, it will be withdrawn back to the light effect elements server by the driving mechanism. In this way, the moving mechanism may not always occupy the space in the direction of the light path, making the space in the light head not in full use, but only temporarily occupy the space in the direction of the light path when the effect sheet is moved to the light path, the space thus can be fully utilized according to the present disclosure. Compared with the traditional technology, a greater number and types of effect sheets can be arranged in the light fixture, and even one moving mechanism can be shared by a plurality of light effect elements servers to further save space, all of which cannot be achieved by any existing stage light fixtures.

As manipulators can imitate some actions of human hands and arms to grasp and carry objects or operate tools according to set procedures, with much flexible operation, the moving mechanism according to the present disclosure may be designed in form of a manipulator.

In order to let the extracted light effect switch in or out of the light path, the moving mechanism specifically includes a transverse driving unit for driving the extracted effect sheet to move in a direction perpendicular to the light path.

Specifically, the transverse driving unit in the present disclosure may include two connecting rods with one end thereof pivotally connected to each other, and a telescopic rod with two ends thereof respectively connected to the other end of each connecting rod. With stretching and retracting the telescopic rod, the angle of the two connecting rods thus can be changed to increase or decrease the overall length of the two connecting rods, thereby enabling the effect sheet to move in the direction perpendicular to the light path.

According to the present disclosure, the effect sheet is fixed to the moving mechanism by magnetic force in a way that the moving mechanism is provided with a magnetic unit and the effect sheets are made of magnetic material or have a magnet, so that when the moving mechanism approaches the required effect sheet, the effect sheet will be magnetically attracted from the light effect elements server and be fixed to the driving mechanism, in such an easy way, the required effect sheet is extracted from the server completely. On the other hand, when the effect sheet is withdrawn back to the light effect elements server by the driving mechanism, the effect sheet can be separated from the moving mechanism with the magnetism therebetween lost, or the effect sheets can be forcibly separated from the moving mechanism once the effect sheet is fixed to the light effect elements server.

The moving mechanism has a clamping unit for clamping and fixing the effect sheet according to one embodiment of the present disclosure. In such configuration, when it is convenient to be clamped, the effect sheet thus can be easily extracted and withdrawn by the clamping unit.

For the situation that the effect sheets themselves are not convenient to be clamped, each of the effect sheets is received in the light effect elements server via a mounting base, and the effect sheet thus is moved with the mounting base by the driving mechanism. Since effect sheets are generally not convenient to be directly mounted, fixed, taken or placed. It thus facilitates the effect sheets being extracted and withdrawn from the server by the driving mechanism, in such way that the effect sheets are received in the light effect elements server 300 with being arranged on the respective mounting base.

In order to make the light spots projected by the stage light fixture to generate rotary effects, the moving mechanism is further provided with a rotary-driving unit for driving the effect sheet on the moving mechanism to rotate, thus achieving more brilliant stage effects.

Specifically, the rotary-driving unit includes a rotary-driving motor and a rotary-driving gear connected to a driving shaft of the rotary-driving motor. Correspondingly, the effect sheet is arranged on amounting base which includes a rotary base and a fixed base pivotally connected to each other. The fixed base is used for mounting and fixing the rotary base, such as the server and the driving mechanism, and the rotary base is used for mounting the effect sheet and can be driven to rotate by the rotary-driving gear. The rotary-driving gear can be directly or indirectly engaged with the rotary base to drive the rotary base to rotate according to any known methods.

In a bid to drive the effect sheet to move in the direction of the light path to change the divergence angle of the light beam or generate a special light effect, the moving mechanism may have a longitudinal driving unit for driving the effect sheet to move in the direction of the light path.

According to one embodiment of the disclosure, the longitudinal driving unit includes a sawtooth track, a gear engaged with the sawtooth track, and a longitudinal driving motor with a pivot shaft thereof connected to the gear, and the moving mechanism moves in the direction of the light path with the cooperation of the gear and the sawtooth track. Particularly, the sawtooth track is fixed, and the longitudinal driving motor, the gear and the moving mechanism move as a whole.

In the present disclosure, the light effect elements server includes a plurality of mounting parts fixed to a housing of the light head, which are configured to fix the effect sheets in a pluggable way. In such way, the light effect elements server makes use of the inner side wall of the housing to directly fix the effect sheets, without any additionally components for fixing the effect sheets.

According to the present disclosure, the effect sheets include one or more of a light shading sheet, a light dimming sheet, a light shaping sheet, an aperture, a gobo, an optical filter, a color filter, a frosting lens, a prism, a focusing lens, or a magnifying lens. The light shading sheet enables the light spot to light up and extinguish quickly, the light dimming sheet can adjust the brightness of the light spot, the light shaping sheet can change the shape of the light spot, the aperture can adjust the diameter of the light beam, the gobo enables the light spot to form a special shape, the optical filter can filter light of specific wavelengths, the color filter enables the light spot to have a specific color, the frosting lens can make the light spot more homogeneous, the prism enables the light beam to be split, the focusing lens can adjust the clarity of the light spot, and the magnifying lens can adjust the size of the light spot.

Since different types of effect sheets have different structures, it is more convenient to receive the effect sheets 200 in the different light effect elements server 300 according to types thereof. Therefore, the effect sheets accommodated in each of the light effect elements server are especially of the same type.

To simplify the design of the driving mechanism, each of the light effect elements server is respectively provided with one the driving mechanism. That is, each moving mechanism only moves only the effect sheets in the same light effect elements server, facilitating simplified design of the driving mechanism.

According to the present disclosure the light effect elements server may further provided with a screening mechanism. The light effect elements server correspondingly has a position for the effect sheet waiting to be extracted or withdrawn by the driving mechanism. The screening mechanism is configured to move the corresponding effect sheet of the light effect elements server to the position to be extracted or away from the position to be withdrawn. With such configuration, the screening mechanism thus can move the effect sheet in the light effect elements server, it is advantage for the effect sheet to be extracted from the server or withdrawn back to the server.

The light fixture may be also provided with a support arm for supporting the light head to rotate and a case for supporting the support arm to rotate. Therefore, the light head can be rotated in two dimensions to project the light beam of the light source at any angles.

DETAILED DESCRIPTION

Figure 1:
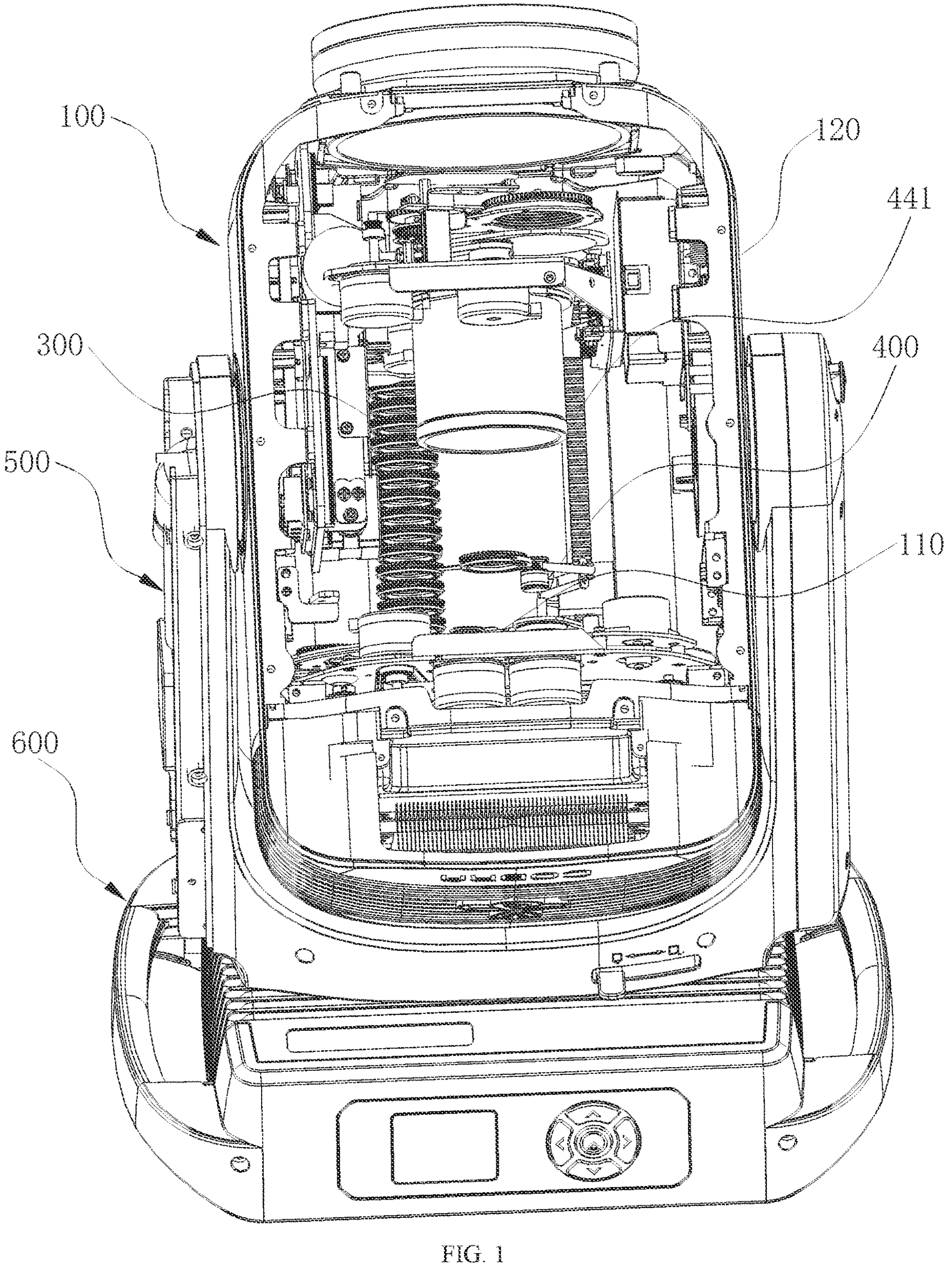
FIG. 1 is a schematic diagram of an internal structure of a stage light fixture having a light effect elements server with one housing thereof is removed according to the present disclosure.

The accompanying drawings are for exemplary illustration only, and should not be construed as limitations on this patent; in order to better illustrate this embodiment, some parts in the accompanying drawings may be omitted, enlarged or reduced, and they do not represent the size of the actual product; for those skilled in the art, it is understandable that certain well-known structures and descriptions thereof in the drawings may be omitted. The positional relationship described in the drawings is only for exemplary illustration, and should not be construed as limitations on this patent.

Figure 2:
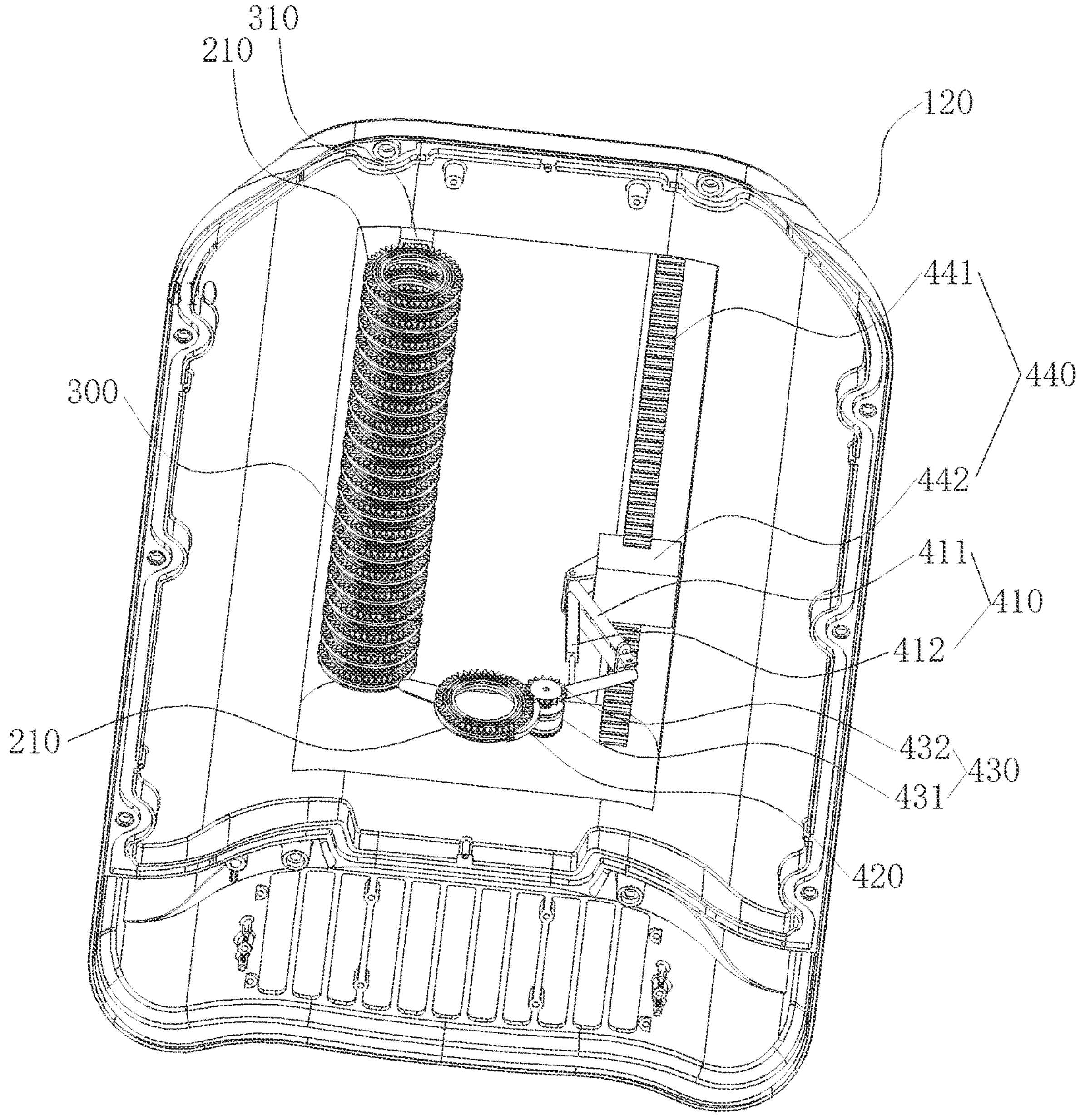
FIG. 2 is a schematic diagram of an internal structure of a housing of the stage light fixture according to the present disclosure.

Referring to FIG. 1 and FIG. 2, a stage light fixture having a light effect elements server is provided according to one embodiment of the present invention, which includes a light source 110 arranged in a light head 100 to generate a light beam, a plurality of effect sheets 200 for allowing the light beam to generate light effects, at least one light effect elements server 300 for receiving or storing the effect sheets 200, and at least one moving mechanism 400 configured to extract at least one of the effect sheets 200 to move between the light effect elements server 300 and the light beam, and can keep such effect sheet 200 in the light beam. The light beam usually forms a light path.

According to the embodiment, different effect sheets 200 are accommodated in the light effect elements server 300, when certain effect sheet 200 needs to be used, such effect sheet 200 can be taken out from the light effect elements server 300 by the moving mechanism 400, and be moved to the light path to allow the light beam to generate light effects. While when the effect sheet 200 does not need to be used, it can be withdrawn back to the light effect elements server 300 by the moving mechanism 400. In this way, the moving mechanism 400 will not always occupy the space in the direction of the light path, making the space in the light head not in full use, but only temporarily occupy the space in the direction of the light path when the effect sheet 200 is moved to the light path, the space thus can be fully utilized. Compared with the traditional technology, a greater number and types of effect sheets 200 can be arranged, and even one moving mechanism 400 can be shared by a plurality of light effect elements servers 300 to further save space, all of such advantages cannot be achieved by the existing stage light fixtures.

The moving mechanism 400 may be designed in form of a manipulator, which can imitate some actions of human hands and arms to grasp and carry objects or operate tools according to set procedures, with flexible operation.

Figure 3:
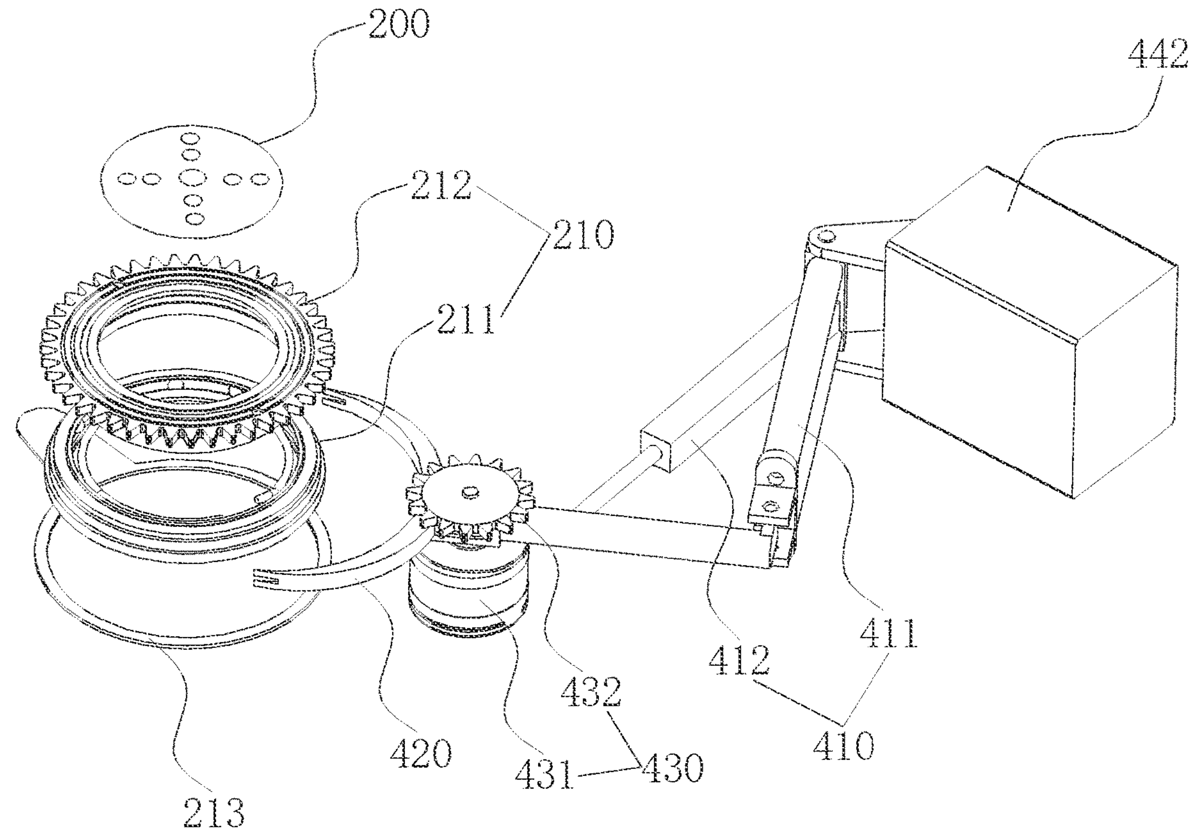
FIG. 3 is a structural schematic diagram showing how a moving mechanism and an effect sheet are cooperated according to the present disclosure.

With regards to FIG. 2 and FIG. 3, the moving mechanism 400 specifically includes a transverse driving unit 410 for driving the extracted effect sheet 200 to move in a direction perpendicular to the light path, so that the effect sheet 200 can be switched in or out of the light path. It should be appreciated that, driving the effect sheet 200 to move in the direction perpendicular to the light path does not only mean that the effect sheet 200 moves in this direction, it is also considered to be within the meaning that the effect sheet 200 has a displacement in this direction during moving.

As FIG. 3 shown, the transverse driving unit 410 includes two connecting rods 411 with one end thereof pivotally connected to each other and a telescopic rod 412 with two ends thereof respectively connected to the other end of each connecting rod 411. With stretching and retracting of the telescopic rod 412, the angle of the two connecting rods 411 can be changed to increase or decrease the overall length of the two connecting rods 411. The effect sheet 200 is fixed at the other end of one of the connecting rods 411, the effect sheet 200 thus can move in the direction perpendicular to the light path.

The telescoping rod 412 may be a telescoping motor or a hydraulic rod.

In order to extract and fix the effect sheet 200, the moving mechanism 400 includes a magnetic unit for fixing the effect sheet 200, the effect sheets 200 correspondingly are made of magnetic material or have a magnet. The effect sheet 200 thus is magnetically fixed to the moving mechanism 400 in such embodiment. When the moving mechanism 400 approaches the required effect sheet 200, the effect sheet 200 will be magnetically attracted from the server and be fixed to the moving mechanism 400, thus being completely extracted from the light effect elements server 300. While when the effect sheet 200 is withdrawn back to the light effect elements server 300 by the moving mechanism 400, the effect sheet 200 can be separated from the moving mechanism 400 with the magnetism therebetween lost, or the effect sheet 200 can be forcibly separated from the moving mechanism 400 once the effect sheet 200 is fixed to the light effect elements server 300.

According to one embodiment, the magnetic unit is arranged at the end of one of the connecting rods 411 for fixing the effect sheet 200 by magnetic force.

The magnetic unit may be an electro-magnet chuck which is magnetic when powered on and nonmagnetic when powered off, or may be a magnetic base which is controlled by a switch to become magnetic or nonmagnetic.

The moving mechanism 400 further has a clamping unit 420 for clamping and fixing the effect sheet 200. When the effect sheets 200 are convenient to be clamped, the effect sheet 200 can be easily extracted or withdrawn by the clamping unit 420.

In the embodiment shown in FIG. 3, the clamping unit 420 includes two clamping claws arranged at the end of one of the connecting rods 411. The required effect sheet 200 thus can be extracted or withdrawn with opening and closing of the two clamping claws.

For the situation that the effect sheets 200 themselves are not convenient to be clamped, each of the effect sheets 200 is accommodated in the light effect elements server 300 via a mounting base 210, the effect sheet 200 thus is moved with the mounting base 210 by means of the moving mechanism 400. In such configuration, the effect sheets are received in the light effect elements server 300 with being arranged on the respective mounting base 210, which facilitates being extracted and withdrawn by the moving mechanism 400, as effect sheets are generally not convenient to be directly mounted, fixed and clamped.

With reference to FIG. 3, additionally, the moving mechanism 400 may be further provide with a rotary-driving unit 430 for driving the effect sheet 200 on the moving mechanism 400 to rotate. With such configuration of the effect sheet 200 being driven to rotate in the light path by the rotary-driving unit 430, light spots projected by the stage light fixture can generate rotated effects, resulting in more brilliant stage effects.

However, it is conceivable that the effect sheet 200 can be directly driven to rotate by the rotary-driving unit 430, and can also be indirectly driven to rotate with rotation of the mounting base 210 of the effect sheet 200 by the rotary-driving unit 430. It is also contemplated that the driving mode of the rotary-driving unit 430 can be a direct engagement way, and can also be an indirect engagement way via a synchronous belt or a transition gear.

In this case, the effect sheet 200 may be a prism or a gobo.

Specifically, according to one embodiment, the rotary-driving unit 430 includes a rotary-driving motor 431 and a rotary-driving gear 432 connected to a driving shaft of the rotary-driving motor 431. The effect sheet 200 is arranged on the mounting base 210 which includes a rotary base 211 and a fixed base 212 rotatably connected to each other. The fixed base 212 is used for mounting and fixing the rotary base 211, and the rotary base 211 is used for mounting the effect sheet 200 and can rotate driven by the rotary-driving gear 432. Notably, the rotary-driving gear 432 can be directly or indirectly engaged with the rotary base 211 to drive the rotary base 211 to rotate in any known methods.

The rotary-driving motor 431 is fixed to the one end of one connecting rod 411, and the rotary-driving gear 432 is connected to the driving shaft of the rotary-driving motor 431.

Additionally or alternatively, according to some embodiments, the moving mechanism 400 includes a longitudinal driving unit 440 for driving the effect sheet 200 to move in the direction of the light path. In such way, divergence angle of the light beam can be changed or special light effects can be generated, with the effect sheet 200 moving in the direction of the light path by means of the longitudinal driving unit 440.

In this case, the effect sheet 200 may be a focusing lens or a magnifying lens.

It should be noted that, the longitudinal driving unit 440 can individually move the effect sheet 200 in the direction of the light path, namely, one end of the moving mechanism 400 is fixed and the other end of the moving mechanism 400 is moved with the moving mechanism 400, or the whole moving mechanism 400 can be moved together with the longitudinal driving unit 440, namely, both ends of the moving mechanism 400 are moved together.

Referring back to FIGS. 1 and 2, according to some embodiments, the longitudinal driving unit 440 includes a sawtooth track 441, a gear engaged with the sawtooth track 441, and a longitudinal driving motor with a pivot shaft thereof connected to the gear, the moving mechanism 400 thus moves in the direction of the light path with the cooperation of the gear and the sawtooth track 441. In such configuration, the sawtooth track 441 is fixed, and the longitudinal driving motor, the gear and the moving mechanism 400 move as a whole.

Preferably, both the longitudinal driving motor and the gear are accommodated in a receiving unit 442 to avoid interference with circuits in the light head 100.

Figure 4:
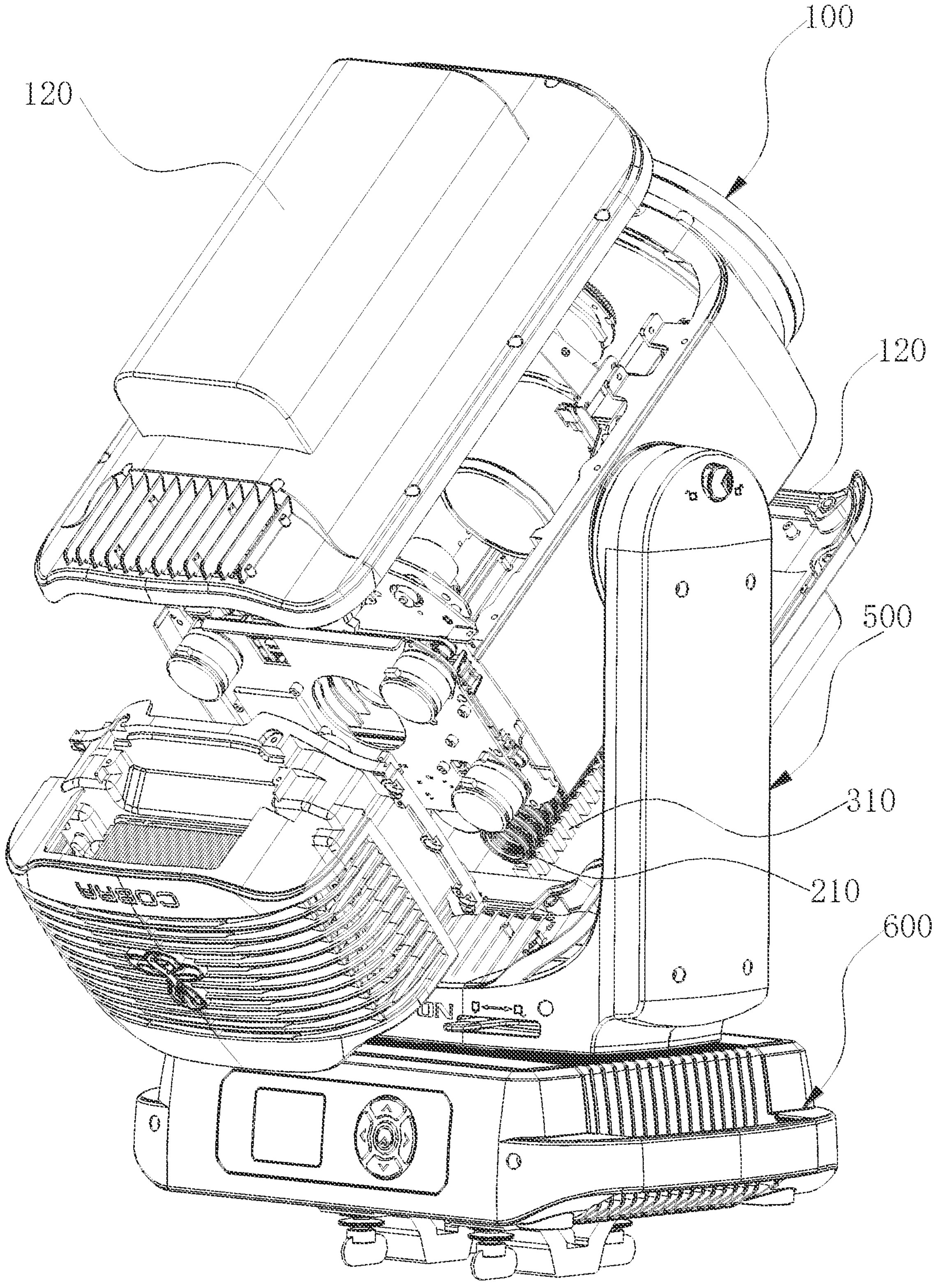
FIG. 4 is a schematic diagram of an exploded structure of the stage light fixture according to the present disclosure.

Referring to FIG. 2 and FIG. 4, according to some embodiments, the light effect elements server 300 includes a plurality of mounting parts 310 fixed to a housing 120 of the light head 100, which are configured to fix the effect sheets 200 in a pluggable way. The light effect elements server 300 in such configuration makes use of the inner side wall of the housing 120 to directly fix the effect sheets 200, without any additionally components for fixing the effect sheets 200.

That is to say, a part of the housing 120 is used as a part of the light effect elements server 300 for the mounting parts 310. Each effect sheet 200 is mounted on the respective mounting base 210 and the mounting base 210 is fixed to the respective mounting part 310 in a pluggable way via a plug-in sheet 213 connected to the respective fixed base 212 of the mounting base 210.

FIG. 4 depicts the light head 100 has two housings 120, and each housing is provided a plurality of the mounting parts 310.

In other embodiments, the light effect elements server 300 may be a separate box, frame, or spiral track.

According to the present disclosure, the effect sheet 200 may include one or more of a light shading sheet, a light dimming sheet, a light shaping sheet, an aperture, a gobo, an optical filter, a color filter, a frosting lens, a prism, a focusing lens, or a magnifying lens. The light shading sheet enables the light spot to light up and extinguish quickly, the light dimming sheet can adjust the brightness of the light spot, the light shaping sheet can change the shape of the light spot, the aperture can adjust the diameter of the light beam, the gobo enables the light spot to form a special shape, the optical filter can filter light of specific wavelengths, the color filter enables the light spot to have a specific color, the frosting lens makes the light spot more homogeneous, the prism enables the light beam to be split, the focusing lens can adjust the clarity of the light spot, and the magnifying lens can adjust the size of the light spot.

Additionally, a plurality of driving mechanisms 400 can be provided to simultaneously move various effect sheets 200 to switch in the light path, The various effect sheets 200 thus cooperate with each other to generate more complicated light rays. It can be noted that, the various effect sheets 200 can be of the same type, for example, all being the light shaping sheet, the optical filter, the gobo, or the prism, or can be different, for example, being the gobo, the optical filter, the color filter, the frosting lens, the prism, the focusing lens, and a magnifying lens, respectively.

However, it is preferable that all the effect sheets 200 accommodated in each of the light effect elements server 300 are of the same type. Since different types of effect sheets 200 have different structures, it is more convenient to store the effect sheets 200 respectively in the different light effect elements server 300 according to types thereof.

In order to simplify the design of the moving mechanism 400, it is configured that each of the light effect elements server 300 is respectively provided with one moving mechanism 400. That is, each moving mechanism 400 only moves the effect sheets 200 in the same light effect elements server 300, thus facilitating simplified design of the moving mechanism 400.

However, in other embodiments, it can be configured that each of the light effect elements servers 300 may provide with various driving mechanisms 400 respectively, or various light effect elements servers 300 are arranged one moving mechanism 400.

Figure 5:
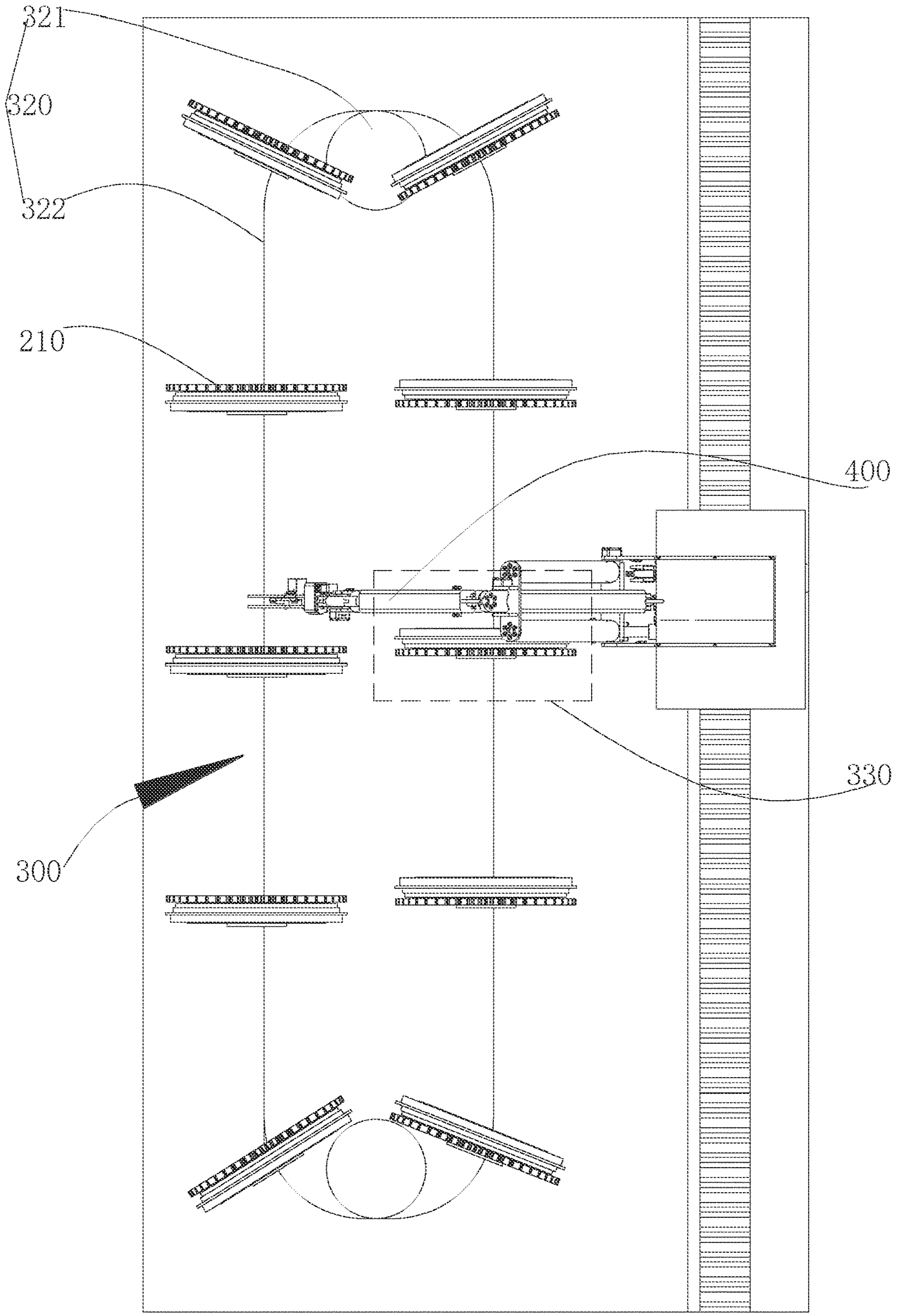
FIG. 5 is a schematic diagram of a light effect elements server with a screening mechanism according to the present disclosure.

According to some embodiments, as shown in FIG. 5, the light effect elements server 300 may further include a screening mechanism 320, the light effect elements server 300 has a position 330 for the light effects waiting to be extracted or withdrawn by the moving mechanism 400, the screening mechanism 320 serves to move the required effect sheet 200 of the light effect elements server 300 to such position 330 or move the effect sheet 200 away from such position 330. That is, the screening mechanism 320 can move the required effect sheet 200 in the light effect elements server 300, which facilitates the effect sheet being extracted or withdrawn to the original position of the light effect elements server 300 by the moving mechanism 400.

Specifically, the screening mechanism 320 may includes a drive roller 321 and a transmission belt 322. The effect sheets 200 are moveably mounted on the transmission belt 322 via the mounting base 210, especially in a pluggable way. It is operable in a way that the transmission belt 322 is conveyed with rotation of the drive roller 321, which in turn drives the effect sheets 200 to move. Once the required effect sheet is moved to the position 330, the moving mechanism 400 will extract the effect sheet to lie in the light path to produce light effects. After completion of use, the effect sheet is withdrawn to the position 330 by the moving mechanism 400 and finally replaced to original place in the light effect elements server 300 by means of the transmission belt 322.

Referring back to FIG. 4, the stage light fixture has a support arm 500 for supporting the light head 100 to rotate and a case 600 for supporting the support arm 500 to rotate. The light head 100 thus can rotate in two dimensions to project the light beam emitted by the light source 110 at any angles.

Obviously, the above-mentioned embodiments of the present disclosure are only examples for clearly illustrating the present disclosure, rather than limiting the implementation modes of the present disclosure. For those of ordinary skill in the art, changes or modifications in other different forms can also be made on the basis of the above description. It is not needed and it is impossible to list all implementation modes here. Any modifications, equivalent replacements and improvements made within the spirit and principles of the present disclosure shall be included within the protection scope of the claims of the present disclosure.

The invention claimed is:

1. A stage light fixture having a light effect elements server, comprising a light source arranged in a light head of the stage light fixture for generating a light beam, the light beam forming a light path;

a plurality of effect sheets for generating light effects;

at least one light effect elements server for accommodating the plurality of the effect sheets; and at least one moving mechanism, which is configured to extract at least one of the effect sheets from the respective light effect elements server to move between the respective light effect elements server and the light beam, and is capable of maintaining the extracted at least one of the effect sheets in the light beam.

2. The stage light fixture according to claim 1, wherein the at least one moving mechanism is in form of a manipulator.

3. The stage light fixture according to claim 1, wherein the at least one moving mechanism comprises a transverse driving unit for driving the at least one of the effect sheets to move in a direction perpendicular to the light path.

4. The stage light fixture according to claim 3, wherein the transverse driving unit comprises two connecting rods with one end thereof pivotally connected to each other, and a telescopic rod with two ends respectively connected to the other end of each connecting rod.

5. The stage light fixture according to claim 1, wherein the moving mechanism comprises a magnetic unit for attracting and fixing the at least one of the effect sheets, the at least one of the effect sheets is made of magnetic material or has magnet, which is capable to being attracted and fixed to the moving mechanism by magnetic force.

6. The stage light fixture according to claim 1, wherein the moving mechanism comprises a clamping unit for clamping and fixing the at least one of the effect sheets.

7. The stage light fixture according to claim 1, wherein each of the effect sheets is accommodated in the respective light effect elements server via a mounting base, so that each of the effect sheets is moved with the mounting base by the moving mechanism.

8. The stage light fixture according to claim 1, wherein the moving mechanism comprises a rotary-driving unit for driving the at least one of the effect sheets on the moving mechanism to rotate in the light beam.

9. The stage light fixture according to claim 8, wherein the rotary-driving unit comprises a rotary-driving motor and a rotary-driving gear connected to a driving shaft of the rotary-driving motor;

each of the effect sheets is arranged on a mounting base which has a rotary base and a fixed base pivotally connected to each other, the fixed base is used for fixing the rotary base; and the rotary base is used for mounting the respective effect sheet and is capable of being driven to rotate by the rotary-driving gear.

10. The stage light fixture according to claim 1, wherein the moving mechanism comprises a longitudinal driving unit for driving the extracted at least one of the effect sheets to move in a direction of the light path.

11. The stage light fixture according to claim 10, wherein the longitudinal driving unit comprises a sawtooth track, a gear engaged with the sawtooth track, and a longitudinal driving motor with a pivot shaft thereof connected to the gear, and the moving mechanism is capable of moving in the direction of the light path with due to cooperation of the gear and the sawtooth track.

12. The stage light fixture according to claim 1, wherein the at least one light effect elements server comprises a plurality of mounting parts fixed to a housing of the light head, which are configured to fix the effect sheets in a pluggable way.

13. The stage light fixture according to claim 1, wherein the plurality of the effect sheets are in form of one or more of a light shading sheet, a light dimming sheet, a light shaping sheet, an aperture, a gobo, an optical filter, a color filter, a frosting lens, a prism, a focusing lens, or a magnifying lens.

14. The stage light fixture according to claim 1, wherein effect sheets accommodated in the same light effect elements server are of the same type.

15. The stage light fixture according to claim 1, wherein one moving mechanism is provided for one light effect elements server respectively.

16. The stage light fixture according to claim 1, wherein the light effect elements server further comprises a screening mechanism, the light effect elements server has a position for the at least one of the effect sheets waiting to be extracted or withdrawn by the moving mechanism, and the screening mechanism is configured to move the at least one of the effect sheets of the light effect elements server to the position or away from the position.

17. The stage light fixture according to claim 1, further comprising a support arm for supporting the light head to rotate and a case for supporting the support arm to rotate.

* * * * *